United States Patent
Bergeron et al.

(10) Patent No.: US 7,062,122 B2
(45) Date of Patent: Jun. 13, 2006

(54) TUNABLE OPTICAL ADD/DROP DEVICE

(75) Inventors: Adam Bergeron, Santa Rosa, CA (US); Robert E. Klinger, Rohnert Park, CA (US); Georg J. Ockenfuss, Santa Rosa, CA (US); Markus K. Tilsch, Santa Rosa, CA (US); Frederik Kevin Zernik, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 248 days.

(21) Appl. No.: 10/700,193

(22) Filed: Nov. 3, 2003

(65) Prior Publication Data

US 2004/0096148 A1    May 20, 2004

Related U.S. Application Data

(60) Provisional application No. 60/423,893, filed on Nov. 5, 2002.

(51) Int. Cl.
*G02B 6/28* (2006.01)
(52) U.S. Cl. .................................... 385/24; 385/15
(58) Field of Classification Search ............. 385/15, 385/24
See application file for complete search history.

(56) References Cited

U.S. PATENT DOCUMENTS

| | | | |
|---|---|---|---|
| 6,292,299 B1 | 9/2001 | Liou | 359/583 |
| 6,320,996 B1 | 11/2001 | Scobey et al. | 385/18 |
| 6,909,548 B1* | 6/2005 | Duggan | 359/578 |

* cited by examiner

*Primary Examiner*—Jennifer Doan
(74) *Attorney, Agent, or Firm*—Allen, Dyer, Doppelt, Milbrath & Gilchrist, P.A.

(57) ABSTRACT

A wavelength-tunable add/drop device for adding or dropping n channels having different center wavelengths is disclosed. A first multicavity variable optical filter for selectably operable to passing one channel while reflecting n−1 other channels depends upon a location where light is launched into an end of the multicavity optical filter. A broadband optical reflector is disposed directly adjacent to the multicavity variable optical filter and disposed between planes coincident with the first and second surfaces of the variable filter, the broadband reflector having a reflectivity that will reflect all n channels of light. Preferably, the broadband reflector is disposed distal from the bottom and top layers of the multicavity filter and is adjacent to the middle layers or near the middle of the multicavity filter layers.

15 Claims, 9 Drawing Sheets

PRIOR ART

TUNABLE OPTICAL ADD/DROP DEVICE

CROSS-REFERENCE TO RELATED APPLICATIONS

This applications claims priority of U.S. Provisional Patent Application No. 60/423,893 filed on Nov. 5, 2002, entitled "Half-Mirrored Filter For A Hitless Tunable Switch" which is incorporated herein by reference for all purposes.

FIELD OF THE INVENTION

The present invention relates to optical filters, and more particularly to wavelength-tunable optical filters and their use within WDM add/drop devices.

BACKGROUND OF THE INVENTION

Optical fiber and planar waveguide technology are becoming the transmission mediums of choice for many communication networks because of the speed and bandwidth advantages associated with optical transmission. In addition, wavelength division multiplexing (WDM) is being used to meet the increasing demands for higher data rates and more bandwidth in optical transmission applications.

In its simplest form, WDM is a technique whereby parallel data streams of modulated light of different wavelengths in the form of channels are coupled simultaneously into the same optical fiber. As such, a WDM signal is typically viewed, as a composite optical signal comprised of a plurality of optical wavelength channels sharing a single transmission medium, each wavelength channel having a different center wavelength of light. Although each wavelength channel actually includes a range of wavelengths making up the channel width, it is common to refer to an optical wavelength channel in terms of its center wavelength.

It is often necessary to add or remove a particular wavelength channel at various points along an optical fiber transmission path, without significantly disturbing or disrupting the remaining wavelength channels, that is, in a substantially "hitless" manner, whether the optical transmission system is a long haul, metropolitan, or local. Adding or removing a wavelength channel is accomplished utilizing add/drop devices. An add/drop device typically utilizes a bandpass filter, that is, an optical filter that is transmissive with respect to one or more wavelength channels and reflective with respect to the remaining wavelength channels, to add or remove the desired wavelength channel. The remainder of the wavelength channels not within the passband of the filter, remain unaffected by the device, and the transmission of their respective modulated light data streams is unimpeded.

In recent years, tunable filters have been developed which, when incorporated as the optical filter in an add/drop device, enable the device to be dynamically tuned to add or remove a desired optical wavelength channel from the plurality of wavelength channels. In the instance where it is desired to change the added or dropped wavelength channel, it is easily accomplished without having to replace the filter element, or the entire add/drop device with another having the desired bandpass characteristics. This is typically accomplished by repositioning the filter with respect to an incident optical beam. However, one unfortunate aspect resulting from dynamically tuning an add/drop device is that intermediate wavelength channels, those channels having wavelengths existing between that of the initially tuned channel and that of the finally tuned channel, will each sequentially exhibit a temporary loss of signal continuity as the filter is tuned to each respective channel's wavelength. This occurs because the point of incidence of the optical beam upon the filter, in transitioning from a point corresponding to the initially tuned channel to a point corresponding to the finally tuned channel, passes filter locations corresponding to each of the intermediate channels. When the composite optical signal light strikes filter locations corresponding to intermediate wavelength channels, intermittent data loss from those intermediate wavelength channels results. Such an intermittent loss of data is often referred to as a so-called "hit." The deleterious effects of a data hit, to the devices for which the data is intended to be transmitted, are well known. Devices exposed to such a data loss must either compensate for the loss of data, or request retransmission of the lost data. Ultimately, such data loss results in diminished quality of service, decreased bandwidth efficiency, or both.

Although known so called "hitless filters" may not be entirely hitless, data loss is reduced and bandwidth efficiency improved while tuning an optical add/drop device having a substantially hitless wavelength-tunable optical filter. For example, U.S. Pat. No. 6,292,299, filed in Feb. 14, 2000 and issued Sep. 18, 2001 in the name of Liou; Kang-Yih, assigned to Lucent Technologies Inc. incorporated herein by reference, describes a hitless wavelength-tunable optical filter that includes a broadband reflective region and a tunable filter region. The so called hitless tuning of the device is accomplished by changing the point at which an optical beam is incident upon the filter region along a constant wavelength channel track whenever the beam strikes the device in the filter region. Realignment to a position associated with a new wavelength channel track is performed when the optical beam is incident upon the broadband reflective region. Repositioning the optical beam to the filter region occurs at a location corresponding to the new wavelength to be added/dropped and subsequent optical beam realignment within the filter region is along the new wavelength channel track. Although the hitless wavelength-tunable optical filter disclosed by Liou appears to perform its intended function, there are believed to be limitations to this filter for which this invention provides solutions.

Another US patent to an invention essentially the same as that of Liou, is disclosed in U.S. Pat. No. 6,320,996 with a provisional priority date of Dec. 31, 1998, and is now assigned to JDS Uniphase.

Figures 1, 4:
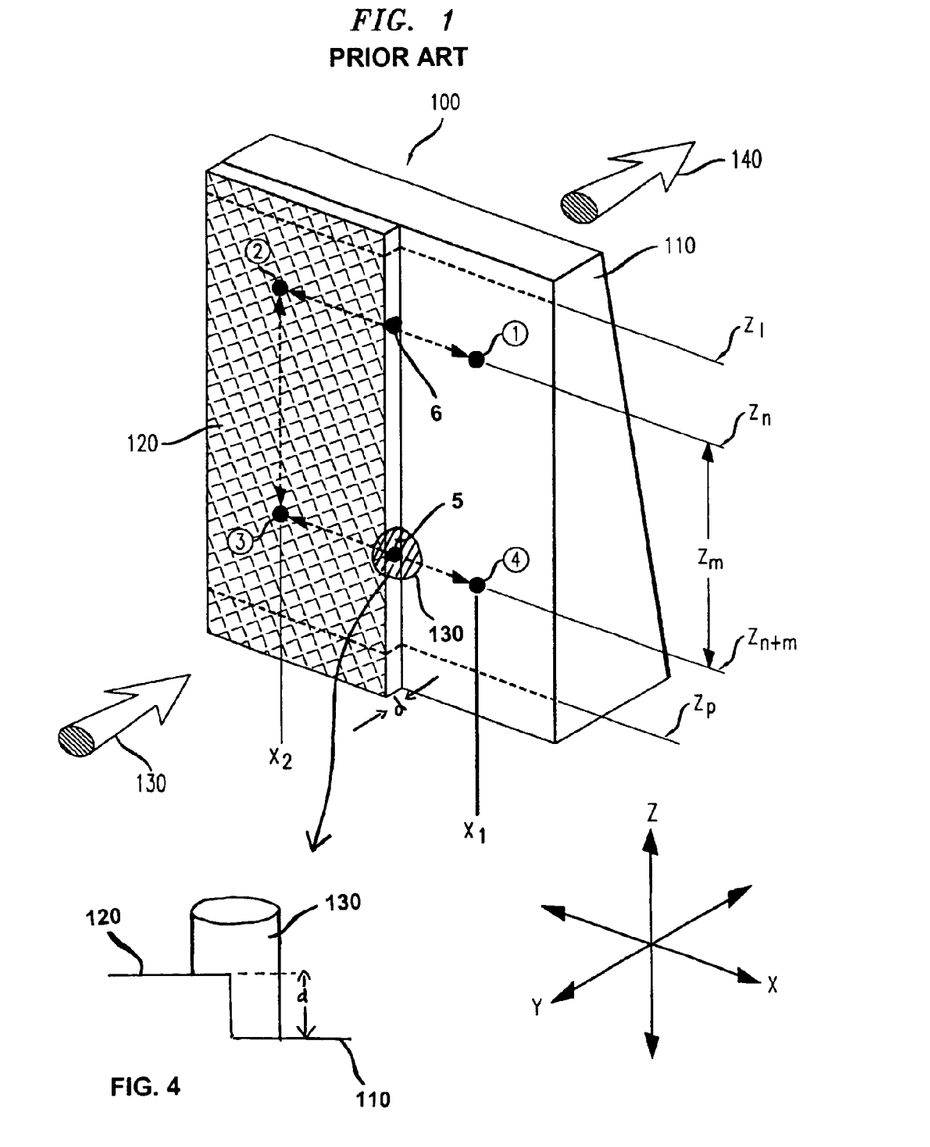
FIG. 1 shows a prior art wavelength-tunable optical wedge filter with broadband optical reflector.
FIG. 4 illustrates a blown-up portion of the filter shown in FIG. 1 wherein a transition region about the mirror filter portion is shown in greater detail.

Ideally, a hitless filter should have negligible or "no" loss incurred in the express channels when a single channel is being dropped or added. Notwithstanding, data transmission errors may result in the example using a mirror 120 as shown in FIG. 1 of U.S. Pat. No. 6,292,299. The potential problem occurs when the beam and/or filter are moved relatively wherein the beam makes a transition from the un-mirrored portion 110 to the mirrored portion 120 such that different portions of the same beam impinge upon the two portions 110 and 120. This will occur when the optical beam moves between points 1 and 2, or 3 and 4 due to a phase discontinuity between the mirrored and un-mirrored portions.

One skilled in the art could suggest placing the mirror at the opposite side of the filter with respect to the incident optical beam signal. This would eliminate the phase discontinuity described in the previous paragraph, for all express channels, in this instance, those reflected.

In that case however, the central wavelength corresponding to any given position of the optical beam on the mirrored area will suffer temporal delay when compared to all other channels. This delay will correspond to the light traveling back and forth across the whole filter for that central wavelength channel and, this would result in coupling loss for that channel. The coupling loss, or "hit", will travel from channel to channel as the beam is translated from point 2 to point 3 in FIG. 1.

It is an object of this invention to lessen the effect of the phase discontinuity for the optical beam signal crossing between the mirrored and un-mirrored portions, while lessening optical path length delays for the optical beam signal incident over the mirrored portion.

It is an object of this invention to provide a variable filter that is substantially "hitless" lessening both an unwanted phase delay and an optical path length delay simultaneously.

SUMMARY OF THE INVENTION

In accordance with this invention a wavelength tunable add-drop device is provided for adding a dropping a plurality of wavelength channels, the device having a thin film multicavity variable filter wherein a portion of the filter has a layer disposed therein along a length extending substantially beside the linear variable filter that is a broadband reflector to the wavelength-channels for allowing substantially hitless adding and dropping of channels.

In accordance with the invention, there is provided, a wavelength-tunable add/drop device for adding or dropping n channels each having different center wavelength, comprising:
a first multicavity variable optical filter having a top end defining a first surface and a bottom end defining a second surface, said multicavity variable optical filter selectably operable to pass one channel while reflecting n−1 other channels or to reflect one channel while passing n−1 other channels, wherein the selection of the one channel to be passed or reflected depends upon a location where light is launched into one of the top and bottom ends of the first multicavity optical filter; and,
a broadband optical reflector directly adjacent to the multicavity variable optical filter and disposed between planes coincident with the first and second surfaces, the broadband reflector having a reflectivity that will reflect all n channels of light, wherein the broadband filter is spaced from the planes coincident with the first and second surfaces.

In accordance with this invention, a wavelength tunable add-drop device is provided having a filter having a first transmissive region and a second reflective region, said regions disposed between first and second opposite ends of the filter, a first end of the transmissive region for receiving a beam of light including a plurality of wavelength channels of light, and a second end of the transmissive region transmitting a different one of said channels of light therethrough, [0.1][0.2]in dependence upon a light receiving position on the first end of the filter, wherein the filter includes a plurality of optical cavities between opposite ends of the filter, each cavity having one or more half wave spacer layers of high or low refractive index material sandwiched between reflecting layers of material, the second reflecting region including a broadband optical reflector to all of the different channels of light, wherein said broadband optical reflector is disposed within or between one of the optical cavities.

In accordance with another aspect of this invention, a wavelength-tunable add/drop device is provided including a multicavity optical filter having a first region operable to add or drop a optical wavelength channel selected from a plurality of optical wavelength channels; and a second region, adjacent to said first region, said second region operable as a broadband optical reflector, wherein the first region comprises a tunable optical filter and wherein the second region includes a partial quarter wave or odd multiple quarter wave layer within the multicavity filter.

BRIEF DESCRIPTION OF THE DRAWINGS

Exemplary embodiments of the invention will now be described in conjunction with the drawings in which.

DETAILED DESCRIPTION

FIG. 1 is an illustration of a hitless wavelength-tunable optical filter 100, in accordance with the teaching of prior art U.S. Pat. No. 6,292,299. The hitless wavelength-tunable optical filter 100 includes two regions. The first region includes a wavelength-tunable optical filter 110 and the second region, adjacent to the first region, has a broadband optical reflector 120.

The wavelength-tunable optical filter also referred to as the filter region 110 illustrated in the embodiment of FIG. 1 is a multi-layer dielectric wedge filter.

The broadband optical reflector, also referred to as the broadband reflective region, 120 utilized in one exemplary embodiment of the present invention is a thin broadband reflective metallic; coating, such as gold or silver, disposed over a portion of the filter region 110.

The operation of the hitless wavelength-tunable optical filter 100, is now described. Assume that the hitless wavelength-tunable optical filter 100 is included as a component of an add/drop device incorporated within a WDM system having a total of p wavelength channels included within the incident composite optical signal beam 130. The optical signal beam of a single wavelength channel 140 is shown passing the filter region 110 region, whenever the incident composite optical signal beam 130 strikes the filter region 110. The reflected composite optical signal is not shown. Transition between functionality of the hitless wavelength-tunable optical filter 100 as a bandpass filter and as a broadband reflector is accomplished by changing the point at which the incident composite optical signal beam 130 strikes the device with respect to the x-axis. When positioned to strike the hitless wavelength-tunable optical filter 100 in the filter region 110, for example, along x coordinate $x_1$, the device operates as a bandpass filter. However, when positioned to strike the hitless wavelength-tunable optical filter 100 in the broadband reflective region 120, for example, along x coordinate $x_2$, the device operates as a reflective coupler. When the incident composite optical signal beam 130 is positioned to strike the filter region 110, the wavelength channel that the device will transmit is determined by the relative z-coordinate at which the incident composite optical signal beam 130 strikes the filter region 110. For example, if the incident composite optical signal beam 130 strikes the filter region 110 at location 1, ordered pair $(x_1, z_n)$, then the device will transmit the $n_{th}$ wavelength channel through the filter region 110 and reflect all other wavelength channels. However, if the incident composite optical signal beam 130 strikes the filter region 110 at location 4, ordered pair $(X_1, z_{(n+1)})$, then the device will transmit the (n+m)th wavelength channel through the filter region 110 and reflect all other wavelength channels.

When utilized as a drop device, the incident composite optical signal 130 is comprised of p wavelength channels and the reflected optical signal is comprised of (p−1) wavelength channels, the wavelength channel dropped being the single wavelength channel 140 being transmitted through the filter region 110. When utilized as an add device, the incident composite optical signal 130 is comprised of (p−1) wavelength channels and the reflected optical signal is comprised of p wavelength channels, the wavelength channel added being the single wavelength channel 140 being transmitted through the filter region 110, albeit in a direction opposite that illustrated.

Further assume that the incident composite optical signal beam 130 is initially positioned to strike the filter region 110 at location 1, thereby transmitting the nth wavelength channel as a dropped channel; and that it is desired to change the pass band so that the (n+m)th wavelength channel is dropped instead. Thus, either the incident composite optical signal beam 130 must be repositioned, or the filter itself repositioned, to enable the incident composite optical signal beam 130 to strike the filter region 110 at location 4. Prior art tunable filters have only a filter region, with no broadband reflective region; therefore, tuning is accomplished completely in a region of active filtering, in effect, the equivalent of transitioning from location 1 to location 4 completely along the x coordinate $x_1$ in the device shown. As opposed to other prior art filters, when other known prior art filters are utilized in a WDM add/drop device and the device is tuned from the nth wavelength channel to the (n+mth wavelength channel, each of the intermediate wavelength channels (that is, wavelength channels [n+1], [n+2], [n+3], . . . , [n+m−2], and [n+m−1]) experiences an intermittent loss of data, or a data hit.

Figure 2:
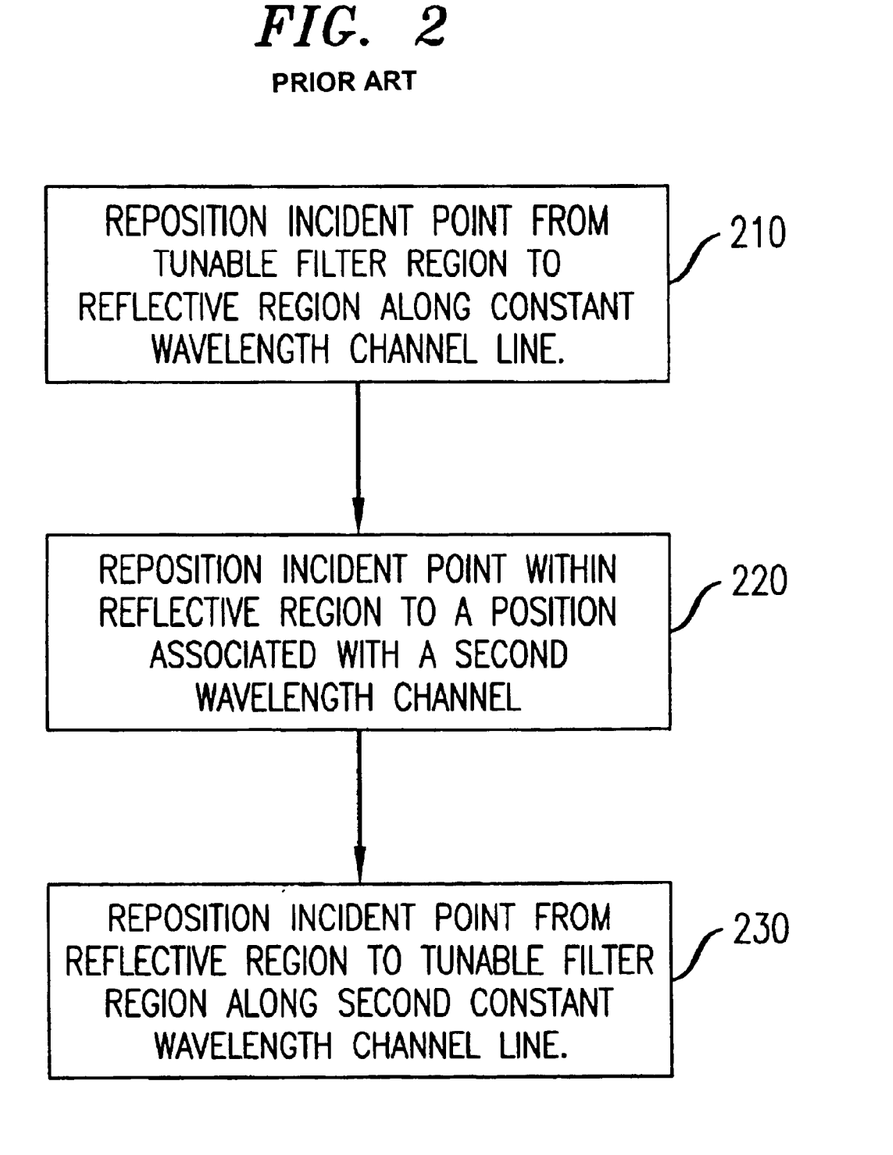
FIG. 2 is a flow chart of an exemplary process for the hitless tuning of the prior art wavelength-tunable optical filter of FIG. 1.

In contrast, the prior art filter shown in U.S. Pat. No. 6,292,211 as illustrated in FIG. 2, the hitless wavelength-tunable optical filter 100 operates as follows in changing the selected pass band of the filter region 110 from the nth wavelength channel to the (n+m)th wavelength channel. In accordance with step 210, the incident point, the relative point at which the incident composite optical signal beam 130 strikes the filter region 110, is repositioned from the filter region 110 to the broadband reflective region 120 along a constant wavelength channel track, a line in the instant embodiment, from location 1 to location 2. The constant wavelength channel track is a plot of points along the filter region 110 having constant bandpass characteristics; that is, passing the same wavelength channel at all points. The constant wavelength channel track from location 1 to location 2 is along the z-coordinate $z_n$, and corresponds to the nth wavelength channel. Once optical signal beam 130 strikes the hitless wavelength-tunable optical filter 100 in the broadband reflective region 120, all wavelength channels are reflected and none are transmitted, regardless of the precise point of incidence within the region. Therefore, repositioning of the incident point within the region may occur without affecting optical and system performance.

In accordance with step 220, the incident point is repositioned within the broadband reflective region 120 to a position associated with a constant wavelength channel track for the wavelength channel to which the filter is to be tuned, the (n+m)th wavelength channel in the instant example. Repositioning may follow any path so long as the incident point remains contained within the broadband reflective region 120. In this illustrative example, repositioning is from location 2 to location 3 along the x-coordinate $x_2$. Location 3 is defined by the ordered pair $x_2, z_{(n+m)}$.

In accordance with step 230, the incident point is repositioned from the on broadband reflective region 120 to the filter region 110 along a constant wavelength channel track, from location 3 to location 4. The constant wavelength channel track from location 3 to location 4 is along the z-coordinate $z_{n+m}$, and corresponds to the (n+mth wavelength channel. Once optical signal beam 130 strikes the device within the filter region 110, the (n+m)th wavelength channel is transmitted and all other wavelength channels are reflected. It would be understood by those skilled in the art that each of the previously recited repositioning steps may be accomplished by altering the location at which an incident composite optical signal beam 130 strikes the hitless wavelength-tunable optical filter 100, through whatever means utilized, including: (i) repositioning said hitless wavelength-tunable optical filter 100 with respect to a fixed incident composite optical signal beam 130, (ii) repositioning the incident composite optical signal beam 130 with respect to a fixed hitless wavelength-tunable optical filter 100, or (iii) repositioning both the incident composite optical signal beam 130 and the fixed hitless wavelength-tunable optical filter 100.

Figure 3:
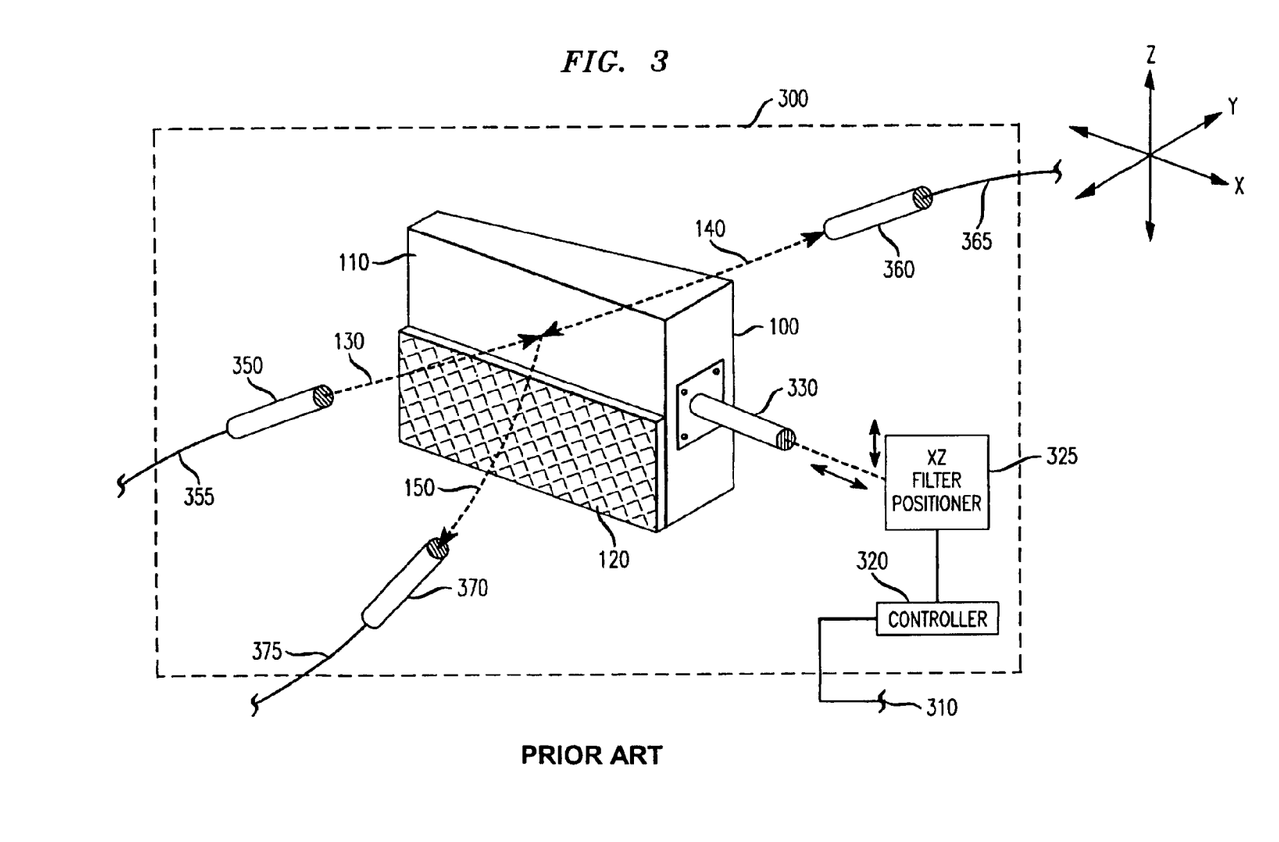
FIG. 3 is a block diagram showing the prior art add/drop device incorporating a wavelength-tunable optical wedge filter with broadband optical reflector.

In FIG. 3 from U.S. Pat. No. 6,292,299 a diagram of the add/drop device 300 is shown in which the filter type used is a multi-layer tunable dielectric filter and the filter is positioned using well-known lateral slide tuning of a wedge filter to select a particular wavelength channel for add/drop.

Referring now to prior art FIG. 3, an optical beam collimator 350 is coupled to an optical fiber 355 as a means for providing the incident composite optical signal beam 130 to be imparted upon the hitless wavelength-tunable optical filter 100. An optical beam collimator 360 is coupled to an optical fiber 365 for providing the transmitted wavelength channel optical signal beam 140 for adding/dropping through the hitless wavelength-tunable optical filter 100. An optical beam collimator 370 is coupled to an optical fiber 375 for providing the reflected composite optical signal beam 150 from the hitless wavelength-tunable optical filter 100. A positioning coupler 330 is utilized to couple the hitless wavelength-tunable optical filter 100 to a filter positioner.

With respect to the multi-layer tunable dielectric filter utilized in FIG. 3, an XZ positioner 325 is used, since positioning with only two degrees of freedom is required. Device positioning along the x-axis changes the point of incidence at which the optical signal beams strike the surface of the filter region 110 and therefore the wavelength channel, which is transmitted through the device, is changed. Device positioning along the z-axis changes the point of incidence of the optical signal beam from between the filter region 110 and the broadband reflective region 120, and therefore determines whether the filter is active and passing a wavelength channel, or the broadband reflective region is active and reflecting the entire incident composite optical signal beam.

Referring now to FIG. 1 it is of note that at locations 5 and 6 as the beam and filter are relatively repositioned, for example, the beam traversing from locations 1 to 2 or from locations 3 to 4, the beam having a finite width, traverses the filter surface 110 and then the mirror surface 120. During the transition from one surface to the other the express channels contained in the beam to be reflected are partially reflected from the filter surface 110 and are partially reflected by the mirror 120. The problem hereafter termed "phase mismatch" appears during this transition.

The phase of the optical signal reflected is mathematically related to its optical delay Both are function of the wavelength of light.[0.3][0.4] When comparing the portion of the optical beam reflected from the mirrored area 120 to the portion reflected from the un-mirrored area, there is a phase mismatch for a given wavelength if the optical paths and resulting phases upon reflection are such that the phase difference between the 2 portions is substantially different from 0 or a multiple of $2\pi$.

By its nature, the broadband reflector, or mirror, illustrated in FIG. 1 will reflect all wavelengths across all channels with similar phase. In contrast, due to its nature, the bandpass filter will not reflect all wavelengths across all channels with similar phase. The central wavelengths from the bandpass channel i in FIG. 5 will be substantially transmitted. The wavelengths from the channels adjacent to the center one i+/−1 in FIG. 5 will effectively travel inside the filter and exhibit a larger phase change than the channels further away i+/−n. This is believed to be the case for any multicavity bandpass filter. This thereby results in an intrinsic unwanted phase mismatch at the transition between the mirrored and un-mirrored areas, as the phases cannot be matched simultaneously for all wavelengths across all reflected channels.

Figure 5A:
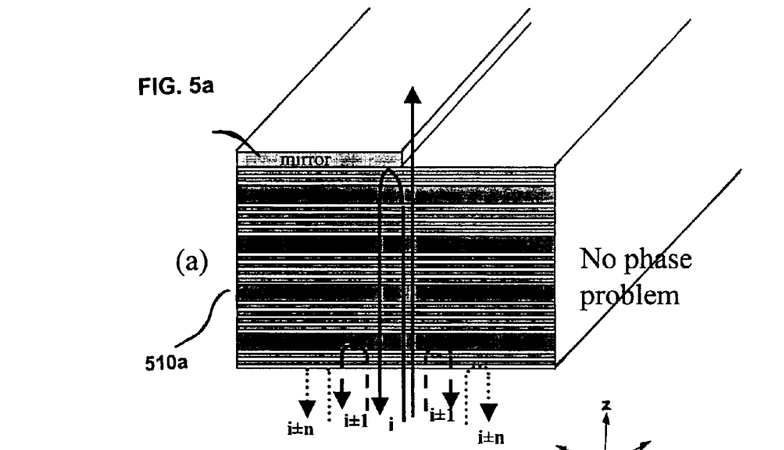
FIG. 5*a* is a prior art variable filter having a mirror disposed on top of the multicavity variable filter wherein "a phase problem" is obviated.
Figure 5B:
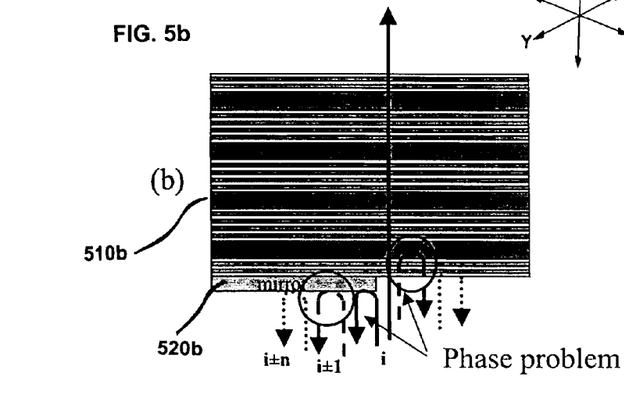
FIG. 5*b* is an alternative embodiment from that of FIG. 5 wherein the mirror is disposed on a bottom of the multicavity variable filter wherein "the phase problem" exists.

The unwanted phase mismatch is schematically illustrated in FIG. 5b.

Phase mismatch will cause diffraction of the beam as it transits the discontinuity, which can cause momentary signal loss at a receiving end. This is believed to be intrinsic to the presence of the phase discontinuity between the two regions, even in the presence of a near perfect interface dividing the two regions.

In FIGS. 5a through 5c and 6a through 6c, different channels separated in wavelength (i, i+/−1, i+/−n) are illustrated with a separation in space. This is only a schematic representation to illustrate the explanations, which follow. There is no separation in space, as all channels should be seen as traveling together within the same finite beam space.

Turning now to FIGS. 5a and 5b the phase mismatch will be described in further detail. In FIG. 5a light incident upon the bottom of the right hand side of the filter having wavelengths other than "i" for example channels having center wavelengths i±1, i±n are reflected by the thin film filter wherein the channel having center wavelength "i" traverses the portion of the filter shown according to its position on the variable filter. As the beam traverses the filter into and out of the page in the Y direction, different wavelengths are transmitted. As the beam is moved to the left side of the filter along the X direction, one of the required steps in adding or dropping channels, there is essentially no disturbance to the wavelengths i±1, i±n and the channel or wavelength "i" is reflected from the mirror. In this instance there is virtually no "phase mismatch" problem experienced by any of the wavelengths of light.

Turning now to FIG. 5b, wherein the mirror is disposed on the bottom of the filter, a phase mismatch clearly exists. As the beam is moved from the right to the left of the filter in the X direction, each of the channels will traverse the transition or step where the mirror begins. Since the beam has a finite width as the beam is partially over the mirror and partially over the filter absent the mirror, there will be a relative phase difference between different portions of the same beam.

Figure 5C:
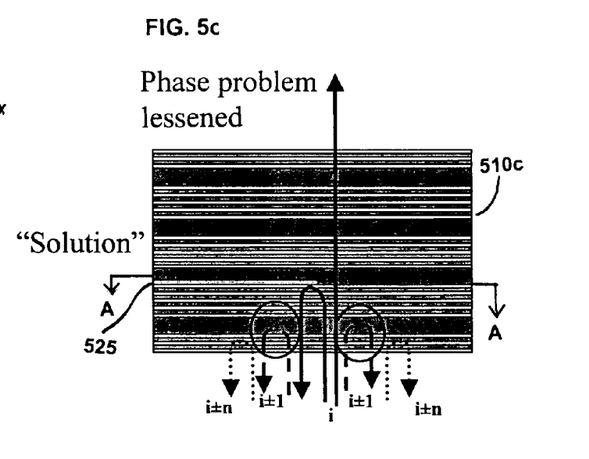
FIG. 5*c* is an alternative embodiment in accordance with this invention wherein "the phase problem" is significantly lessened.

The filter shown in FIG. 5c in accordance with this invention, offers a solution to this problem which lessens the relative phase delay or phase mismatch within a same channel as the beam traverses the filter from right to left, or vise versa along the X direction.

Figure 6A:
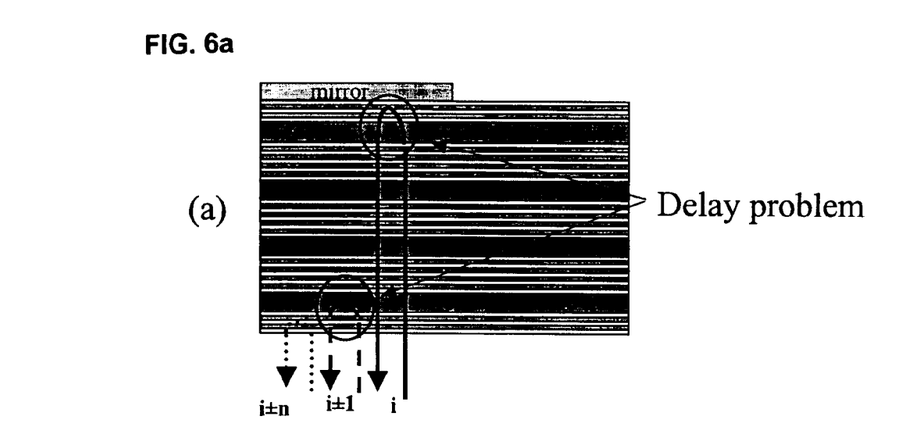
FIGS. 6*a* and 6*b* correspond to the device shown in FIGS. 5*a* and 5*b* and illustrate a "delay problem" associated with the embodiment of FIG. 6*a*.
Figure 6B:
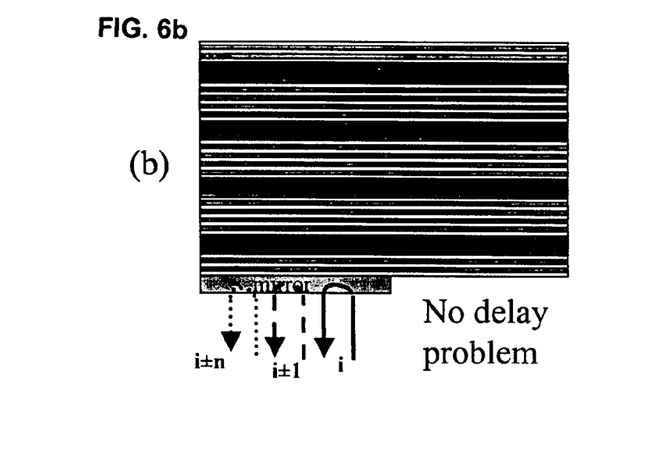
Figure 6C:
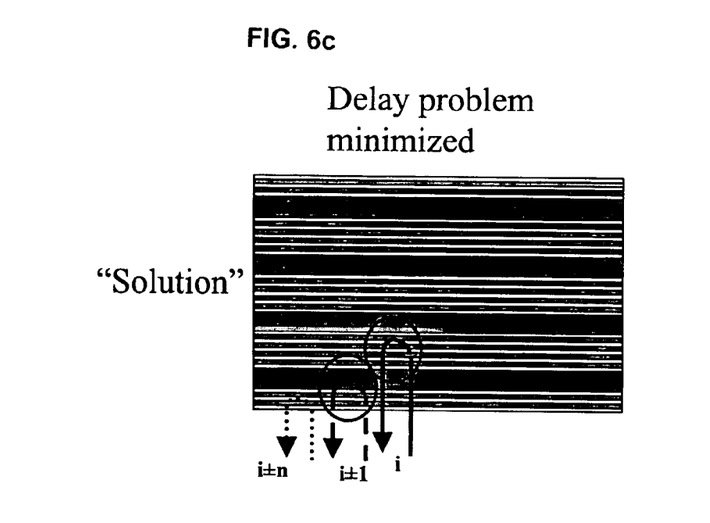
FIG. 6*c* shows the same filter shown in FIG. 5*c* and provides a solution to the delay problem associated with the embodiment of FIG. 6*a* wherein the delay is significantly lessened.

The reason however that the filter shown in FIG. 5a is not selected as the ideal filter, given that the phase problem is essentially obviated, will become clear when referring to FIGS. 6a, 6b and 6c; since there are two separate problems which must be overcome, and the filter shown in FIGS. 5c and 6c lessens the unwanted effects of both.

Figure 7:
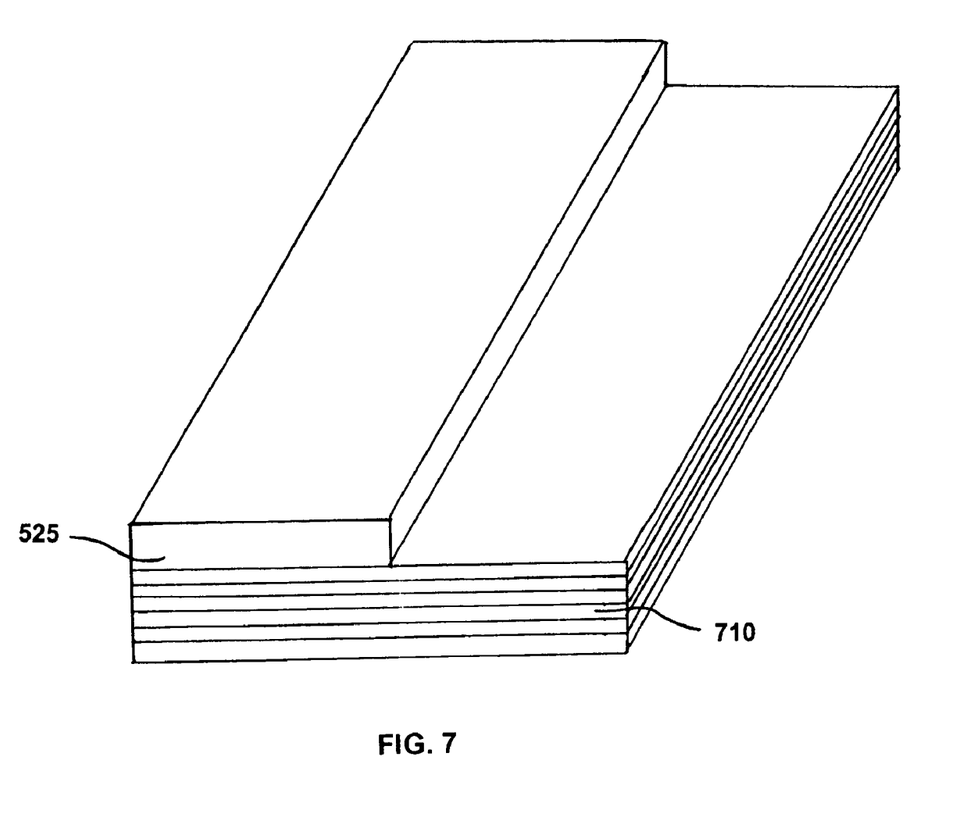
FIG. 7 is a isometric view taken along the stepped line A—A in FIG. 5*c* with the upper portion removed for ease of viewing.

In FIGS. 5c, 6c and FIG. 7 a thin quarter wave layer 525 is disposed within a portion of the filter extending from the front face to the back face along the Y direction beside the variable filter region on the right which similarly runs front to back along the same direction. Although the thin layer is a quarter wave in thickness at approximately the transmission wavelength of "i" the layer may be more or less than a quarter wave in thickness, for example an integer multiple or fraction thereof, however it may not be a half wave or integer multiple of a half wave in thickness. Essentially it should not appear as a spacer layer, but should function as a highly reflecting layer to all channels of interest. The layer may be an additional layer as shown, or may be an existing layer having selected thickness covering only a portion of the surface so as to not interfere with the portion of the filter serving only as a variable filter, for example the portion to the right of 525 in FIG. 7. In FIG. 5c it can be seen that the phase mismatch illustrated in FIG. 5b is essentially obviated as the propagation and phase of all reflected channels wavelengths are substantially similar between the portions with and without broadband reflector. These channels are essentially reflected by the same filter layers. The bandpass filter design and broadband reflector layer location are specifically chosen to lessen the phase mismatch to a level acceptable in practice for "hitless" transition.

Turning now to FIG. 6a illustrating the same structure as FIG. 5a, it can be seen that as the beam traverses the filter from right to left, such that all of the wavelengths or channels are incident upon the mirror, wavelength "i" and wavelengths i±1, have a large relative delay therebetween. More particularly, wavelength "i" traverses through the entire thin film structure and returns to the bottom of the filter after impinging the mirror on the top, thereby traveling a significant extra optical path length compared with wavelengths i±1. Furthermore, as the beam traverses the filter into and out of the page in the Y direction, different wavelengths suffer the optical path length delay.

FIG. 6b obviates this problem but introduces the phase mismatch problem described heretofore. It can be seen, that the filter shown in FIG. 6c lessens this delay problem and correspondingly lessens the phase problem. The solution is somewhat of a compromise that adequately lessens two different problems for which a best solution for each causes a "hit" or unwanted result for the other.

The filter design and location of the broadband reflector layer or layers within the filter should be selected to lessen both the phase problem that exists by having the mirror on the bottom and the delay problem that exists by having the mirror on the top.

For a bandpass filter with any given number of cavities, the unwanted delay is decreased for a broadband reflector created from or added within a cavity closer to the incident beam side of the filter. At the same time, the unwanted phase mismatch will be decreased for a broadband reflector created from or added within a cavity farther from the incident beam side of the filter.

As for the filter design, the delay and phase variations will be greatest, and phase mismatch and optical delay increased for a "steeper" bandpass. A "steeper" bandpass will be obtained with a larger number of cavities or stronger reflectors between cavities, resulting in stronger resonance of the transmitted channels.

A given filter "steepness" will be dictated by specific application, in terms of transmission of the channel to be added or dropped and rejection of the adjacent channels.

A filter can be designed to be asymmetrical, such that the portion of the filter facing the incident beam is "weaker", minimizing the delay and phase variations. To compensate and preserve the overall steepness of the filter, the portion of layers further away from the incident beam will be made "stronger". The term "weaker" used heretofore corresponds to a smaller resonance and thus a shorter optical path length, and the term "stronger" corresponds to a larger resonance and thus a longer optical path length.

Conveniently, this invention utilizes a thin film layer or layers compatible with the manufacture of the multicavity filter itself to provide a robust, relatively inexpensive solution which lessens delay and phase mismatch.

In a preferred embodiment, a tunable filter for channels spaced at 100 GHz is made from a 4 or 5 cavity bandpass design. The filter is designed to be operated with an optical beam signal incident from the backside, i.e. going through the substrate before reaching the bandpass layers structure. The broadband reflector is to be placed in the second cavity from the substrate side.

Figure 10A:
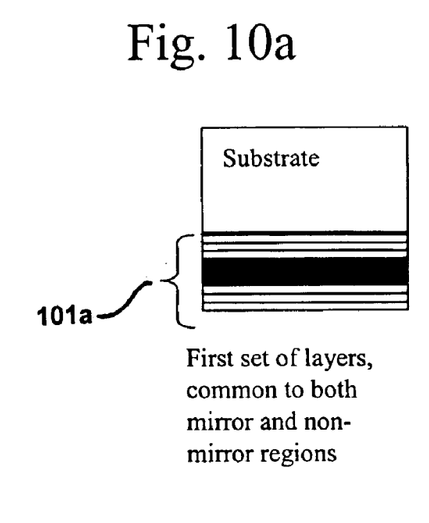
FIGS. 10*a*, 10*b* and 10*c* illustrate steps in a manufacturing process for the variable add drop filter.
Figures 10B, 10C:
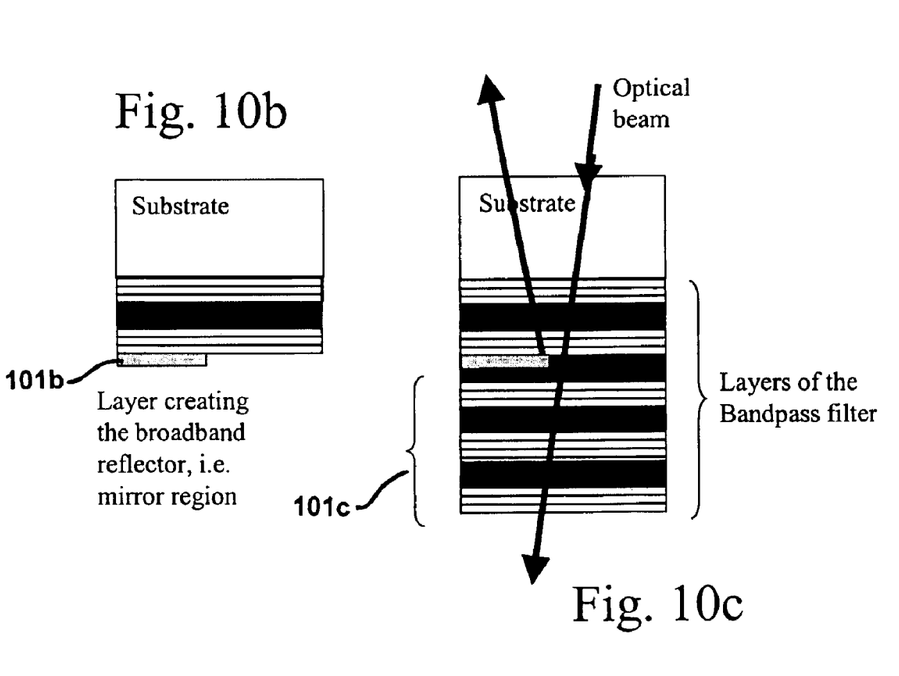

Referring now to FIGS. 10a, 10b, and 10c a preferred method to fabricate the filter in accordance with this invention is described below.

A first set of layers 110a common to both the bandpass and mirror sections is deposited as shown in FIG. 10a, using a deposition system capable of producing the wedged filters; the deposition process may be halted, the chamber vented and a temporary mask applied using for example conventional positive lift-off photoresist technology. The substrate is re-introduced to an appropriate deposition chamber, which may be the same as used for the deposition of the initial layers and at least a single layer of material deposited, whereupon the deposition is again terminated, the substrate again removed from the deposition chamber and the temporary photoresist layer removed, leaving the last deposited layer covering only the "mirror" region 102b as shown in FIG. 10b. The substrate is again returned to an appropriate deposition chamber, and the bandpass structure completed. The competed structure is illustrated in FIG. 10c where the final layers 103c are added.

As illustrated schematically in FIGS. 10a, 10b, and 10c, the resulting structure can present a near perfect interface to the incident optical beam.

In summary, by providing a bandpass filter wherein a portion thereof, internally, can be made into a broadband mirror by disrupting one of the cavities with an extra quarter wave or effective quarter wave or multiple thereof, not including a half wave or multiple thereof, the filter can be optimized to reduce a temporal split that would otherwise be experience by the designs shown heretofore, while essentially preserving sufficient phase continuity.

Of course numerous other embodiments may be envisaged without departing from the spirit and scope of the invention.

For example, in the preferred embodiments described heretofore, the broadband reflector has been described as being one or more layers excluding half wave layers of material that differ from layers on the optical variable filter portion of the device. Notwithstanding, the broadband could be provided by several other realizations.

For example, the absence of a layer in the reflector region of the filter that sufficiently decouples a cavity from the remaining cavities could provide broadband reflectance to only one side of the filter to reflect all channels of interest, thereby providing the required functionality. Or, even a half wave layer of highly reflecting material could be used.

Figure 8A:
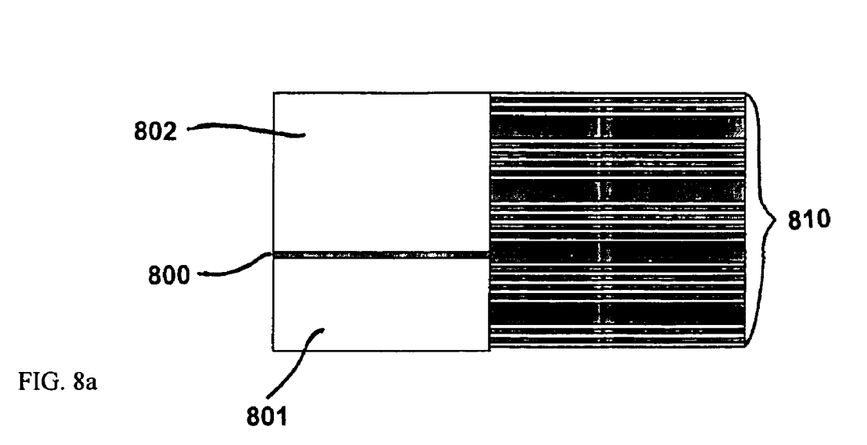
FIGS. 8*a* and 8*b* illustrate embodiments of the invention wherein only a broadband layer is provided supported by a light transmissive region, adjacent to the variable filter.
Figure 8B:
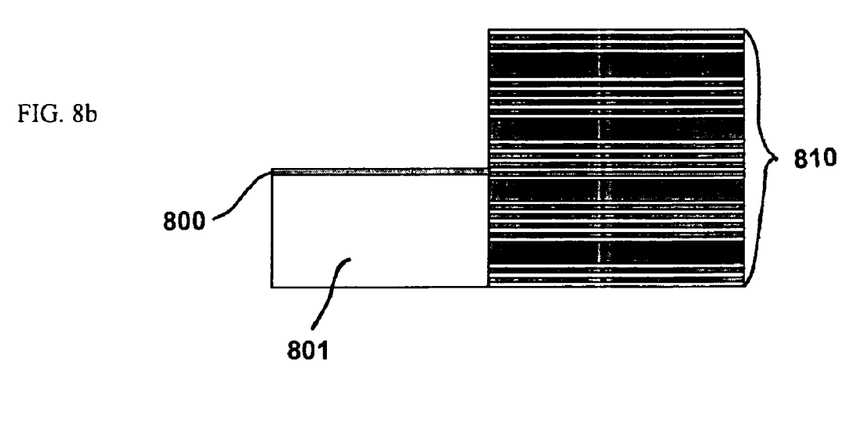

FIGS. 8a and 8b illustrate embodiments of the invention wherein a broadband reflector 800 supported by a light transmissive medium 801 is provided adjacent to a variable filter 810. In FIG. 8a a light transmissive medium 802 is shown over the reflector 800 The transmissive medium can include thin film layer structure to lessen phase mismatch and optical delay hit, i.e. temporal split, as shown in FIGS. 9a through 9c.

Figure 9A:
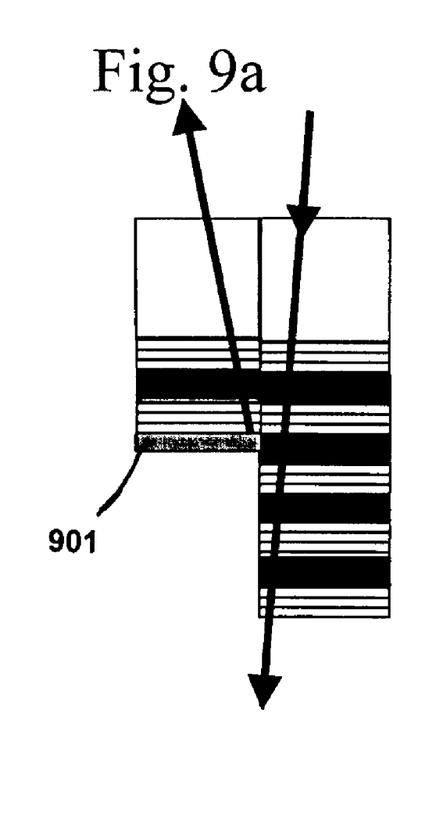
FIGS. 9*a*, 9*b* and 9*c* illustrate embodiments similar to FIGS. 8*a* and 8*b*, where the transmissive region comprises a thin film layer structure designed to match to lessen phase mismatch and optical delay hit.
Figure 9B:
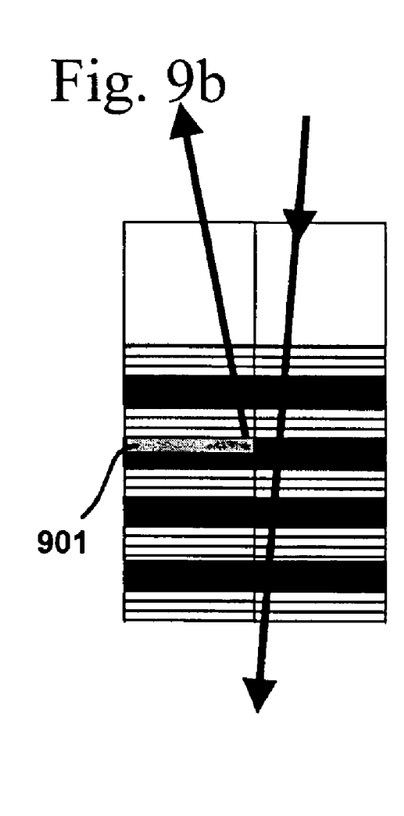
Figure 9C:
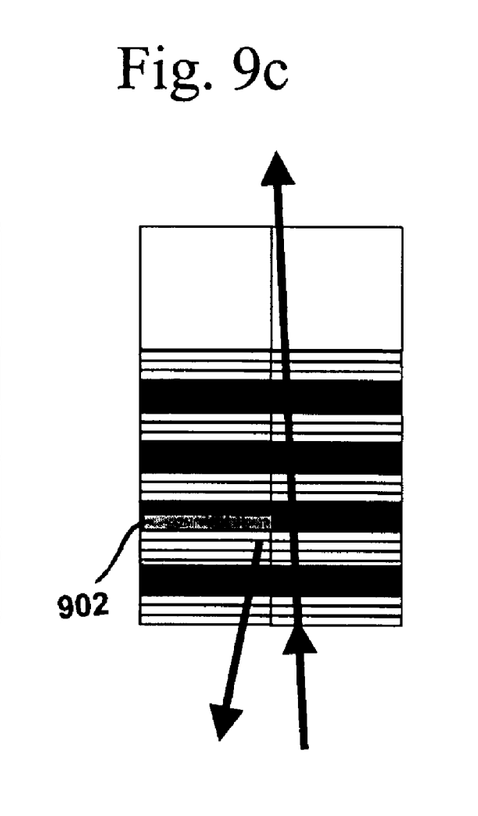

In FIGS. 9a, 9b and 9c the transmissive region comprises a thin film layer structure designed to match to lessen phase mismatch and optical delay hit. The broadband reflecting layer 901 in FIGS. 9a and 9b and 902 in FIG. 9c are shown having the supported by thin film optical cavities, and in FIGS. 9b and 9c, the reflector is disposed between layers forming optical cavities.

Of course, numerous other embodiments may be envisaged, without departing from the spirit and scope of the invention.

What is claimed is:

1. A wavelength-tunable add/drop device for adding or dropping n channels each having different center wavelength, comprising:

a first multicavity variable optical filter having a top end defining a first light receiving surface and a bottom end defining a second light transmitting surface, said multicavity variable optical filter selectably operable to pass one channel through the light transmitting surface while reflecting n−1 other channels or to reflect one channel while passing n−1 other channels through the light transmitting surface, wherein the selection of the one channel to be passed or reflected depends upon a location where light is launched into one of the top and bottom ends of the first multicavity variable optical filter; and, a broadband optical reflector disposed within a region and between layers of the multicavity variable optical filter and disposed between and spaced from planes coincident with the first light receiving surface and second light transmitting surface, the broadband optical reflector having a reflectivity that will reflect all n channels of light.

2. A wavelength-tunable add/drop device for adding or dropping n channels as defined in claim 1, wherein the broadband optical filter is spaced from the planes coincident with the first and second surfaces.

3. A wavelength tunable add-drop device as defined in claim 2, wherein the first multicavity variable optical filter is comprised of one or more metal or a dielectric layers.

4. A wavelength tunable add-drop device as defined in claim 2 wherein the broadband optical reflector is located distal from the plane coincident with the top and bottom ends at a location for simultaneously lessening phase mismatch and optical path length delay between different channels of light.

5. A wavelength tunable add-drop device as defined in claim 2 further comprising means for selectively repositioning a light beam including the n channels along the first variable multicavity filter or along the broad band reflector or there between.

6. A wavelength-tunable add/drop device for adding or dropping n channels as defined in claim 1, wherein the first multicavity variable optical filter is comprised of a first group of layers of high and low refractive index material, and wherein the broadband optical reflector is comprised of second different group of layers of alternating high and low refractive index material, and wherein the broadband reflector has a reflectivity that will reflect the n channels of light.

7. A wavelength tunable add-drop device as defined in claim 6, wherein the broadband optical reflector is a layer having a thickness other than a half wave, or integer multiple of a half wave.

8. A wavelength tunable add-drop device as defined in claim 6, wherein the broadband optical reflector is formed by providing an optical cavity substantially different from the other optical cavities such that decoupling from the other cavities occurs to thereby cause reflection to substantially all of the n channels of light.

9. A wavelength tunable add/drop device as defined in claim 1, wherein the position of the broadband optical reflector is selected to lessen a difference in phase in portions of a beam spanning functionally different regions of the multicavity variable optical filter, while lessening a time delay between wavelengths reflected from the broadband optical reflector and from the multicavity variable optical filter.

10. A wavelength tunable add-drop device comprising:
a filter having a first transmissive region and a second reflective region, said regions disposed between a first input end face and second opposite output end face of the filter, a first end of the transmissive region for receiving a beam of light from the first input end face, said light beam including a plurality of wavelength channels of light, and a second end of the transmissive region transmitting a different one of said channels of light therethrough to the output end face in dependence upon a light receiving position on the first end of the filter, wherein the filter includes a plurality of optical cavities between opposite end faces of the filter, each cavity having one or more half wave spacer layers of high or low refractive index material sandwiched between reflecting layers of material, the second reflecting region including a broadband optical reflector to all of the different channels of light, wherein said broadband optical reflector is disposed within or between one of the optical cavities.

11. A wavelength tunable add-drop device as defined in claim 10, wherein the broadband optical reflector is a layer having a thickness other than a half wave, or integer multiple of a half wave.

12. A wavelength tunable add-drop device as defined in claim 11 wherein the broadband optical reflector comprises a layer which covers only a portion of the filter so that as a bean is positioned to be incident upon the first end of the filter, it may be positioned to be incident upon the transmitting region or the reflecting region.

13. A wavelength tunable add-drop device as defined in claim 11, wherein the broadband optical reflector is substantially a quarter wave or integer multiple of a quarter wave in thickness.

14. A wavelength-tunable add/drop device for adding or dropping n channels of an input signal each channel having different center wavelength, comprising:
a first multicavity optical filter having a top end defining a first surface for receiving the input signal and a bottom end defining a second surface for transmitting channels therethrough, said multicavity optical filter selectably operable to pass one channel through the bottom end, while reflecting n−1 other channels or to reflect one channel while passing n−1 other channels, wherein the selection of the one channel to be passed or reflected depends upon a location where light is launched into one of the top and bottom ends of the first multicavity optical filter; and,
a broadband optical reflector directly adjacent to the multicavity optical filter and disposed between planes coincident with the first and second surfaces.

15. A method of fabricating the multicavity filter and the broadband optical reflector as defined in claim 14 comprising the steps of:
a) providing a light substrate, transmissive to all n channels;
b) depositing a plurality of layers forming a plurality of optical cavities on the light transmissive substrate;
c) covering only a portion of a last deposited layer with a broadband reflecting layer reflective to all n channels;
d) depositing a layer of material over the surface of the broadband reflecting layer and a remaining portion of said last deposited layer to form a layer having a planar surface; and,
e) depositing a plurality of layers forming other optical cavities over said planar surface formed in step (d).

* * * * *